March 25, 1952     C. F. DUERR, JR     2,590,093
HAND-OPERATED MOTOR-DRIVEN RADIAL MACHINE TOOL
Filed Jan. 18, 1946     7 Sheets-Sheet 1

INVENTOR.
Carl F. Duerr, Jr.
BY Harry R. Canfield
ATTORNEY

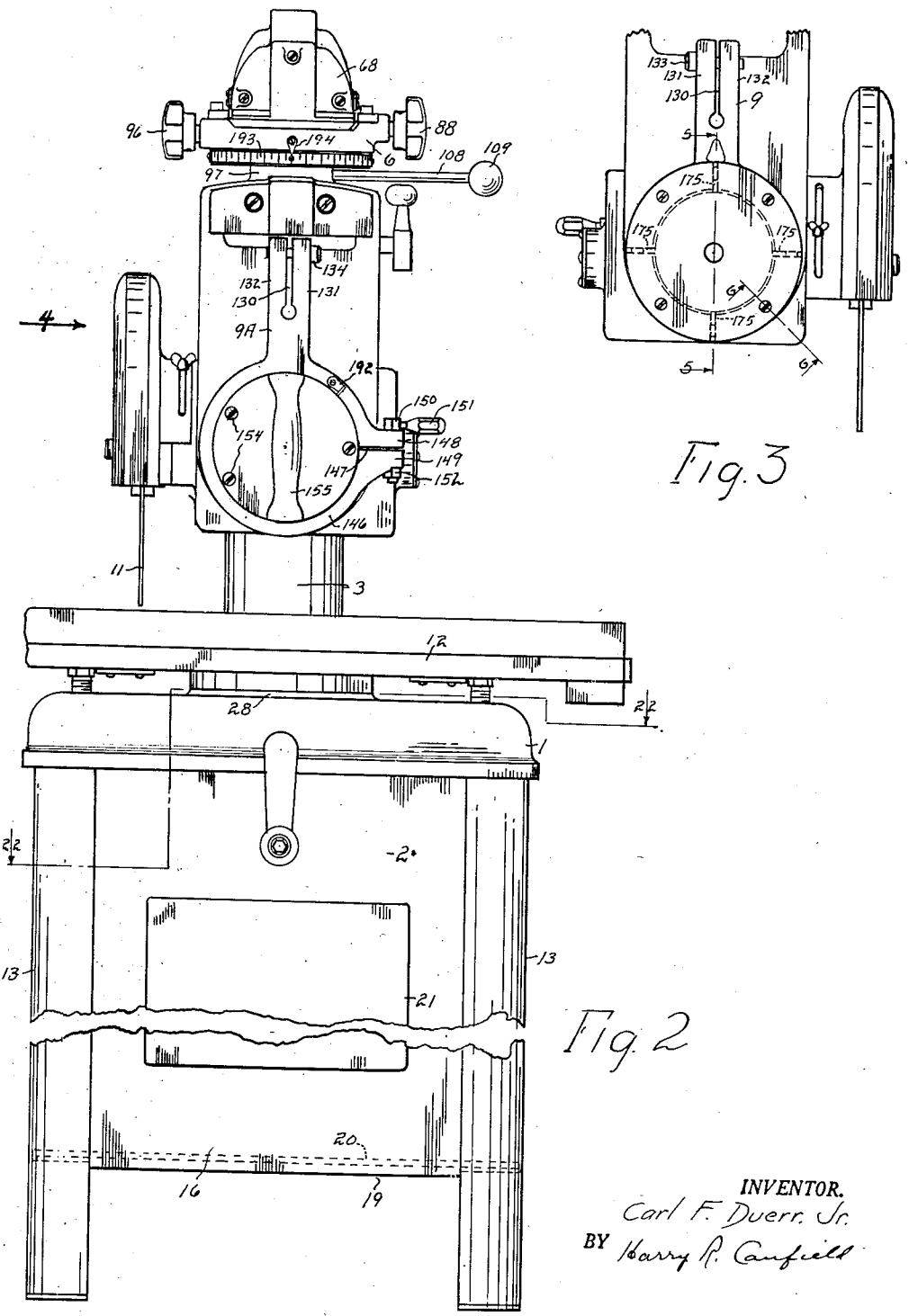

March 25, 1952
C. F. DUERR, JR
2,590,093
HAND-OPERATED MOTOR-DRIVEN RADIAL MACHINE TOOL
Filed Jan. 18, 1946
7 Sheets-Sheet 3
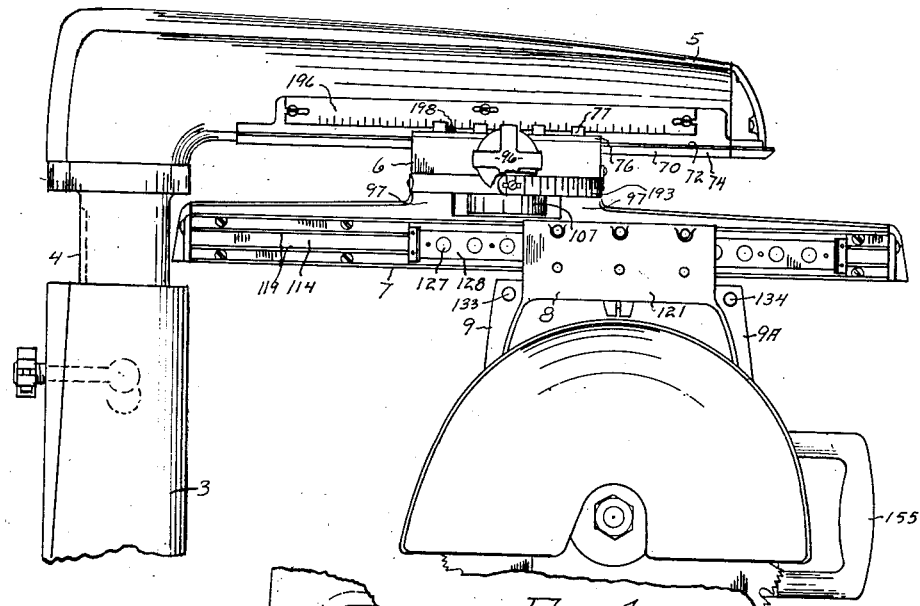
Fig. 4
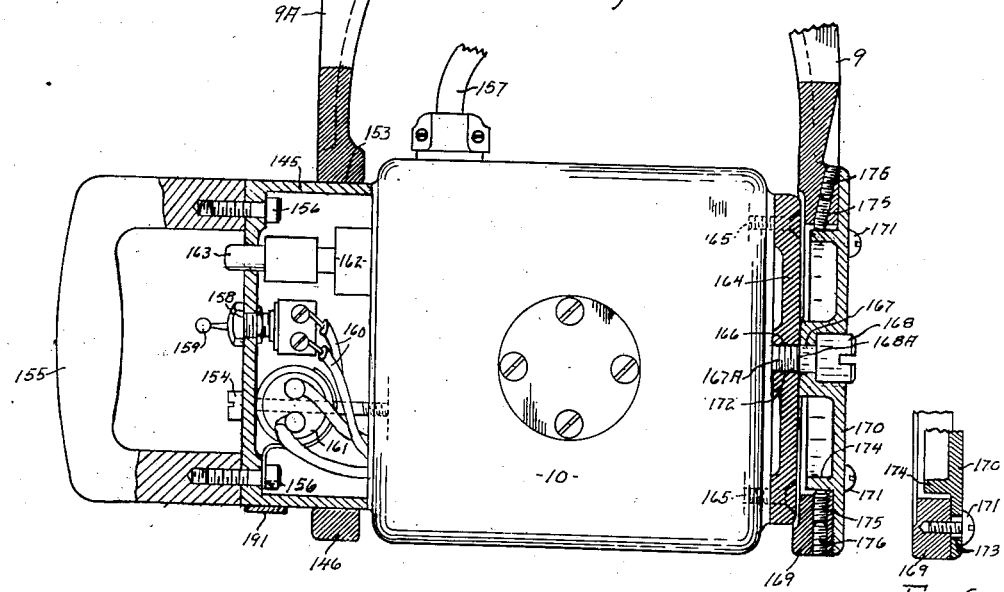
Fig. 5
Fig. 6
INVENTOR.
Carl F. Duerr, Jr.
BY Harry P. Canfield
ATTORNEY March 25, 1952  C. F. DUERR, JR  2,590,093
HAND-OPERATED MOTOR-DRIVEN RADIAL MACHINE TOOL
Filed Jan. 18, 1946  7 Sheets-Sheet 4
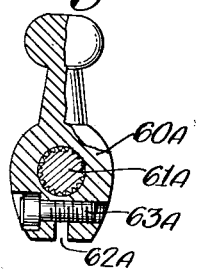
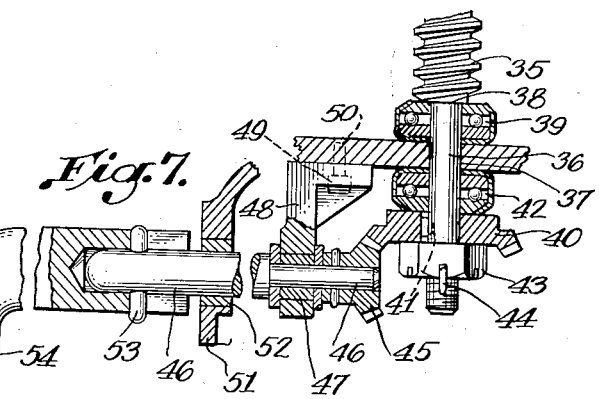
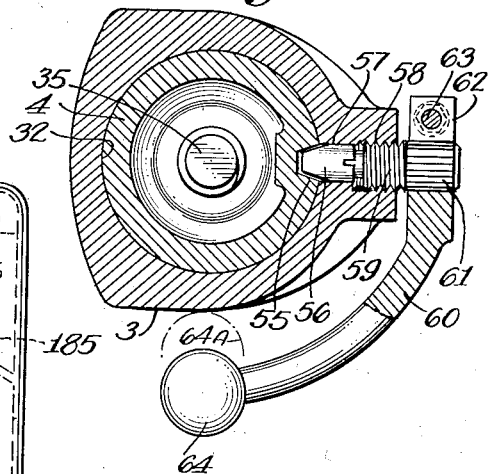
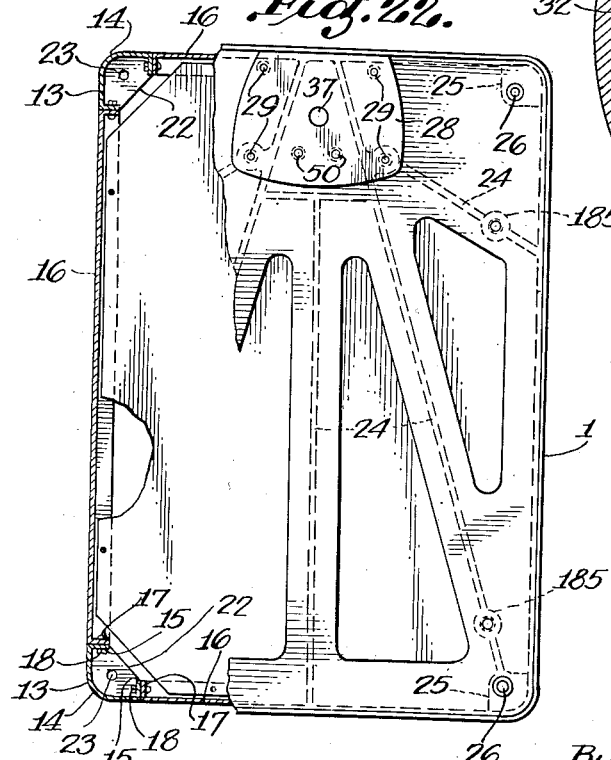
Inventor,
CARL F. DUERR, JR
By Harry P. Canfield
Attorney.

March 25, 1952     C. F. DUERR, JR     2,590,093
HAND-OPERATED MOTOR-DRIVEN RADIAL MACHINE TOOL
Filed Jan. 18, 1946     7 Sheets-Sheet 5

INVENTOR.
Carl F. Duerr, Jr.
BY Harry R. Canfield
ATTORNEY

March 25, 1952 C. F. DUERR, JR 2,590,093
HAND-OPERATED MOTOR-DRIVEN RADIAL MACHINE TOOL
Filed Jan. 18, 1946 7 Sheets-Sheet 6
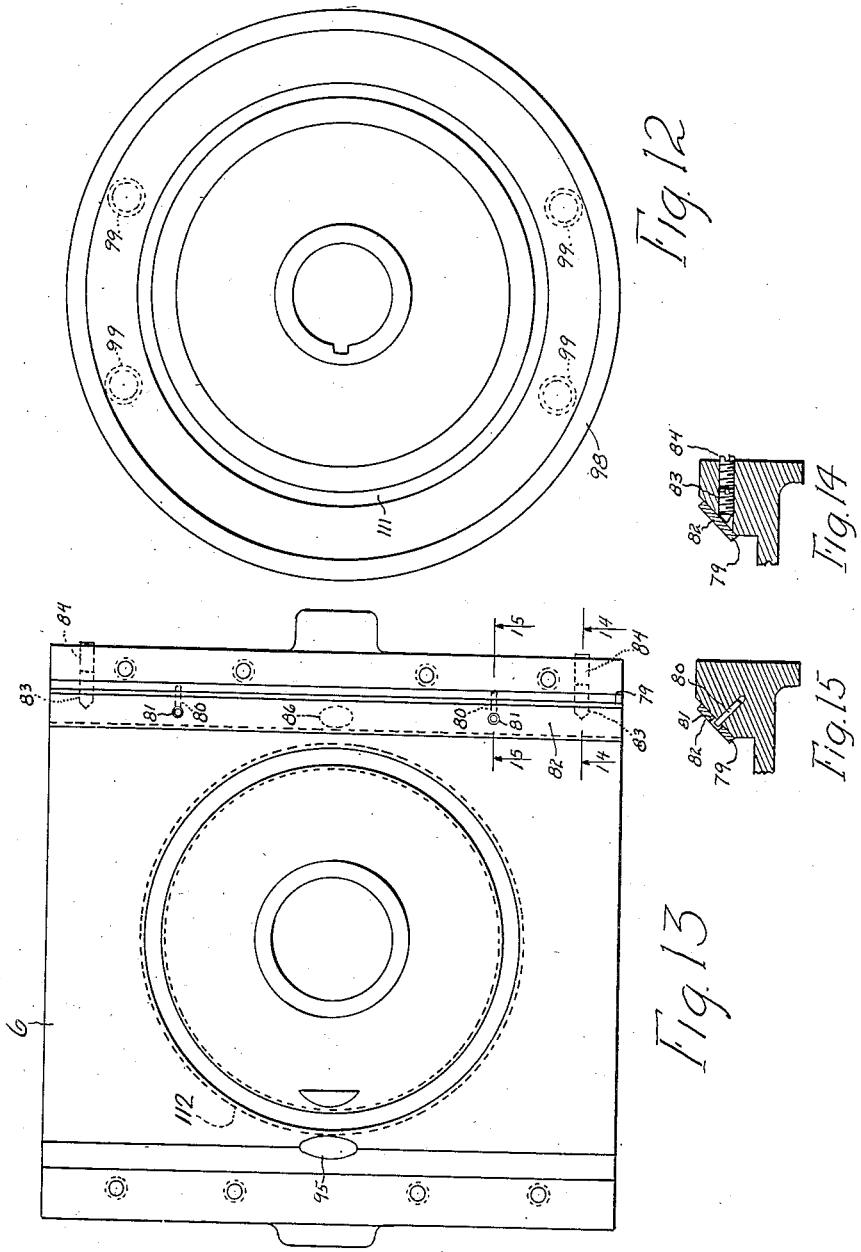
INVENTOR
Carl F. Duerr, Jr
By *Harry R. Canfield*
ATTORNEY INVENTOR.
Carl F. Duerr, Jr.
BY Harry R. Canfield
ATTORNEY Patented Mar. 25, 1952

2,590,093

UNITED STATES PATENT OFFICE 2,590,093

HAND-OPERATED MOTOR-DRIVEN RADIAL MACHINE TOOL

Carl F. Duerr, Jr., Gates Mills, Ohio, assignor, by mesne assignments, of 30/100 to Ralph R. Roemer, 35/100 to Louise E. Roemer, 25/100 to William R. Kiefer, and 10/100 to J. Everette Tompkins, all of Cleveland, Ohio Application January 18, 1946, Serial No. 641,980

15 Claims. (Cl. 143—6)

This invention relates to machine tools of the class in which a motor driven saw or like tool is movable by hand over a work supporting table.

In Patents No. 1,956,835, May 1, 1934, and No. 2,343,243, May 7, 1944, are illustrated and described machine tools of this class and the present invention may be considered as constituting improvements over the machine tools of those patents.

In general, in the machines of those patents, there is an arm overhanging a work supporting table; a carriage is reciprocable on a trackway on the arm and supports a motor driven tool such as a circular wood saw reciprocable with the carriage; the trackway is pivoted intermediate its ends, to swing to different adjustable directional positions on a pivot axis on the arm, to position the line of cutting movement of the saw for cross cutting, rip cutting or miter cutting; the motor and the driven saw may be adjustably rocked to different positions to adjustably position the saw for bevel cutting; the arm and the saw carried thereby may be adjustably raised and lowered.

The present invention has for its primary object, to provide a machine of this class having a pivot bearing for the trackway on the arm which can be adjustably positioned along the arm for purposes to be described.

Other objects are to provide improvements in various constructional features of the machine to improve its mode of operation; to provide an improved support for the machine as a whole to render it portable; to improve the adjusting means for positioning the tool for different cutting operations such as those referred to; to provide improved means for levelling up the work supporting table; for mounting the saw driving motor; for taking up lost motion between the carriage and trackway; for raising and lowering the saw; for adjusting the plane of the saw with respect to the work table and the trackway; and to provide other improvements which will become apparent to those skilled in the art from the description of an embodiment of the invention to follow.

The invention itself and its scope are as set forth in the appended claims.

An embodiment of the invention is fully disclosed in the following description taken in connection with the accompanying drawing in which:

Fig. 2 is a front elevational view of the machine of Fig. 1;

Fig. 3 is a fragmentary elevational view taken in the direction of the arrow 3 of Fig. 1;

Fig. 4 is a fragmentary elevational view taken in the direction of the arrow 4 of Fig. 2;

Fig. 5 is a view to enlarged scale of a part of Fig. 1, but with parts in section that are shown in elevation in Fig. 1; and the right hand end of Fig. 5 may be considered with respect to the plane 5—5 of Fig. 3;

Fig. 6 is a fragmentary view, similar to a part of the right hand end of Fig. 5, but taken on the plane 6—6 of Fig. 3;

Fig. 7 is a view to enlarged scale, with parts broken away, of a part of Fig. 1;

Fig. 8 is a sectional view to enlarged scale from the plane 8—8 of Fig. 1;

Fig. 11 (sheet 4) is a fragmentary broken sectional view from the plane 11 of Fig. 9;

Fig. 12 (sheet 6) is a top plan view of one of the parts of Fig. 9 taken in the direction of the arrow 12 of Fig. 9, and showing said part separately;

Fig. 13 is a top plan view of one of the parts of Fig. 9, taken in the direction of the arrow 13 of Fig. 9, and showing said part separately, but with a gib and its adjustment associated therewith;

Figure 1:
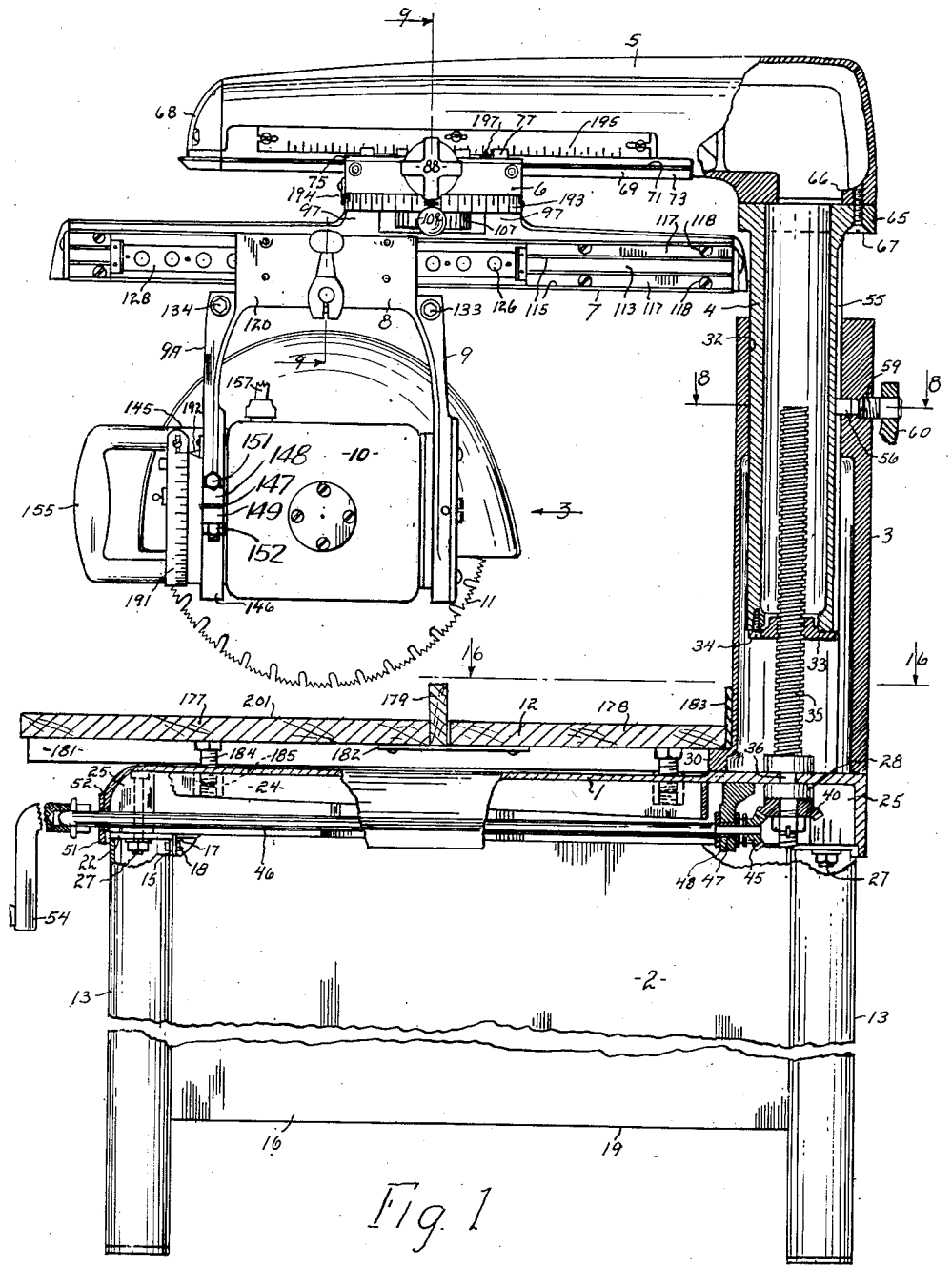
Fig. 1 is a side elevational view of a machine tool embodying the invention with parts broken away and parts in section.
Figure 16:
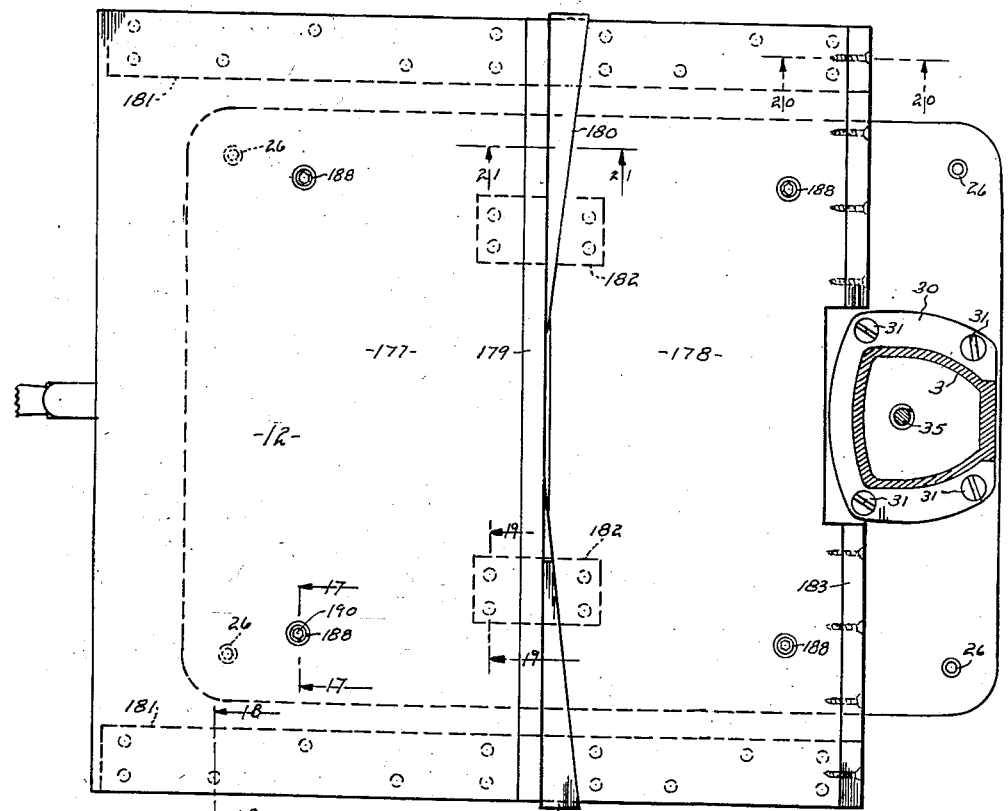
Figure 17:
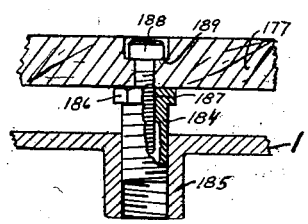
Figure 19:
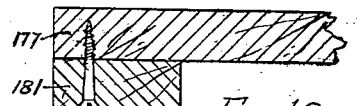
Figure 18:
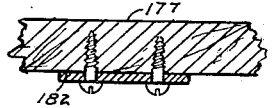
Figure 20:
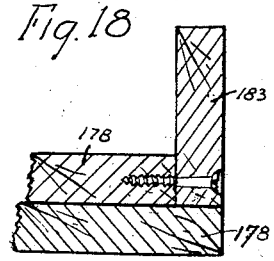
Figure 21:
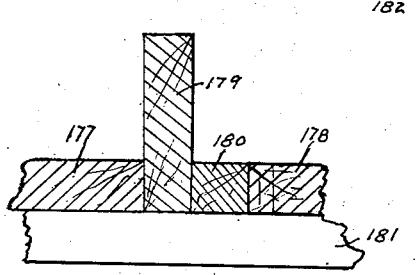

Figs. 14 and 15 are fragmentary sectional views from the planes 14—14 and 15—15 of Fig. 13;

Fig. 16 is a top plan view of the work table top of the machine taken from the plane 16—16 of Fig. 1, with parts of the machine in section;

Fig. 17 is a fragmentary view to enlarged scale from the plane 17—17 of Fig. 16 showing a table top adjustment, the same being shown to smaller scale in Fig. 1;

Figs. 18, 19, 20, and 21 are fragmentary sectional views to enlarged scale from the planes 18—18, 19—19, 20—20, and 21—21 respectively of Fig. 16;

Fig. 22 (sheet 4) is a view showing in plan a part of a table base and supporting cabinet top and showing a part of the cabinet in section, the view being taken from the plane 22—22 of Fig. 2.

As shown in the elevational views, Figs. 1, 2, and 4, the machine tool comprises in general a cast metal main base 1, mounted on the top of a sheet metal support 2 having the form of a cabinet; a column 3 mounted on the base 1; a stem 4 reciprocable vertically in the column 3; a generally horizontal arm 5 on the stem 4; a pivot head 6 adjustably positionable along the arm 5; a trackway 7 adjustably pivotable upon an axis on the head 6; a carriage 8 operatively reciprocable along the trackway 7; hangers 9 and 9A on the carriage 8, supporting a motor 10; a saw 11 driven by the motor; and a work table 12 supported on the base 1, under the saw 11.

The constructional details of the parts referred to generally above, will now be described.

The main support 2 is generally rectangular in horizontal plane, and comprises four corner legs 13—13 formed by bending sheet metal to provide as at 14, Fig. 22, rounded external contours on the legs; the vertical inner edges of the legs thus formed being bent inwardly to provide flanges 15—15. Sheet metal walls or panels 16 at both ends and both sides of the support, are provided, having flanges 17 bolted to the flanges 15 of the legs by bolts 18, Fig. 22. The panels 16 may terminate as at 19 above the lower ends of the legs 13; and an interior shelf 20, Fig. 2, may be provided and supported in any suitable manner, whereby the interior of the support, enclosed by the legs and the side walls, may be used as a cabinet to contain tools, material to be worked, etc. To give access thereto a door 21 may be provided in one or more of the panels, and attached thereto for opening and closing in any suitable manner not essential to the invention.

Top plates 22—22, Figs. 1 and 22, are provided at the tops of the legs 13, and may be secured thereto by welding. Each of these plates is provided with a perforation 23.

The base 1, see Figs. 1, 2, and 22, is generally in the form of a downwardly open shallow cup or pan reinforced on its underside by ribs 24—24, and is generally rectangular in plan with rounded corners. In the corners are bosses 25 which rest upon the leg plates 22, and holes 26 are provided in the bosses, and bolts 27, Fig. 1, are projected downwardly through the holes and through the perforations 23—23 in the leg top plates, with nuts on the bolts under the plates. The base is thus bolted to and rests upon the top of the support.

On the top of the base 1 at one end is a pad 28 provided with four threaded holes 29—29. As shown in Fig. 16, the column 3 has at its lower end a flange 30 which rests upon the said pad, see also Figs. 1 and 16, and bolts 31 are projected through the flange 30 and screwed into the said threaded holes 29 to rigidly mount the column on the base. The column 3 is hollow or tubular as shown in Figs. 1, 16, and 8.

The aforesaid stem 4 is hollow or tubular, Figs. 1 and 8, and exteriorly is circular in cross section, and the upper end portion of the column 3 has a cylindrical bore 32 therein in which the stem has a sliding fit. The lower end of the tubular stem 4 is closed by a nut 33, Fig. 1, secured thereon by a plurality such as three screws 34 one of which is shown in Fig. 1. An elevating screw 35 is meshed with the nut and extends upwardly therethrough into the stem 4, and downwardly therefrom below the nut, and means now to be described is provided to turn the screw to cause it to react upon the base 1 and raise or lower the stem 4 in the column 3, such means being shown best in Fig. 7, although shown in simplified form to smaller scale in Fig. 1.

At the lower end of the screw 35 is a reduced diameter screw stem 36 providing a shoulder 38 on the screw. The stem 36 extends through a hole 37 in the pad 28 of the base 1, Figs. 7 and 22, and a ball thrust bearing 39 is provided between the shoulder 38 and the base 1. A bevel gear 40 is keyed as at 41 to the stem 36, and a thrust ball bearing 42 is provided between the gear and the base 1. A nut 43 threaded on the stem 36 below the gear 40 and having a cotter key arrangement 44 to selectively lock it in any adjustably rotated position, mounts the aforesaid parts in assembled relation on the base 1, with lost motion in the thrust bearings 39 and 42 reduced to the optimum, and with the screw held against lateral displacement by the stem 36 in the bore 37, but rotatable by the gear 40, and with the thrust bearings antifrictionaly taking up the thrust of the screw 35 and transmitting it to the base 1.

A bevel gear 45 is meshed with the bevel gear 40, keyed or pinned to a shaft 46 rotatably supported in a bearing 47, mounted in a bracket 48 secured upon the underside of the base 1 by screws 49 projected through the bracket and screwed into the base 1, the threaded holes in the base for the same being shown at 50—50, Fig. 22 and indicated in Fig. 7.

The shaft 46 extends all the way to the front of the machine and outwardly through a forward wall 51 of the base 1, Figs. 1 and 5, wherein it has a rotary bearing 52, the outwardly projecting end of the shaft having a transverse pin 53 therein, whereby a crank handle 54 may be detachably telescoped on and clutched to the shaft 46 in the well known manner illustrated, to rotate the shaft, and as will now be understood this will rotate the screw 35 to raise or lower the stem 4.

In order that the stem 4 may be rigidly locked to the column 3 after its position is in this manner adjustably changed, and in order that the stem 4 may be freed to be raised or lowered as described, the stem has a longitudinal wedge-form keyway 55 in the rear side thereof, Figs. 1 and 8. A wedge 56 having an inner portion formed to wedgingly fit the keyway 55 and a rearward portion reciprocable in a bore 57 in the column 1 is provided, the outer open end of the bore 57 being threaded as at 58, and a stud 59 being screwed into the threads 58. Upon rotating the stud 59 in one direction the wedge 56 is engaged with the keyway 55 to lock the stem 4 and column 3 rigidly together and to prevent rotation of the stem 4 in the column out of a preselected position for it; and upon rotating the stud in the other direction the engagement is loosened whereby the stem may be freely raised or lowered. To rotate the stud 59, a handle 60 is mounted on the outer end of the stud.

The preferred way to mount the handle 60 on the stud 59 is to make the stud 59 of hard metal such as steel with longitudinal teeth or splines 61 thereon, and to make the handle 60 of relatively soft metal such as aluminum with a smooth bore therein embracing the splines, and with one side of the bore slotted out or open as at 62, and with a screw 63 to clamp the soft metal bore upon the splines. (This construction is not illustrated in cross section for the handle 60, but an identically similar construction with the suffix A for the reference characters is shown in Fig. 11 for another part to which reference may here be made.)

The hard metal male splines 61 bite into the soft metal of the handle making groovelike indentations or female splines thereon. In case of wear or any other cause requiring adjustment of the handle rotatively on the stud 59, the screw 63 is loosened and the handle rotated on the male splines until the male splines again seat in the female splines made in the soft metal. By this method, intermeshing male and female splines are provided respectively on the stud and on the handle without the necessity of cutting accurate female splines by machining operations in the handle. Also, the splines 61 need not be cut by a cutting tool but can be formed simply by knurling.

Preferably the handle 60 is bent around the column 3 to bring the end 64 of the handle opposite the side of the column, as shown in Fig. 8. The operator to operate the wedge 56 for locking purposes may raise the handle or strike it upwardly, and to unlock the wedge he may strike it downwardly, and it will then be stopped by engagement with the side of the column, as indicated in broken line at 64A as a convenient means for limiting the movement of the handle and for making it readily accessible and conveniently operable.

Figure 9:
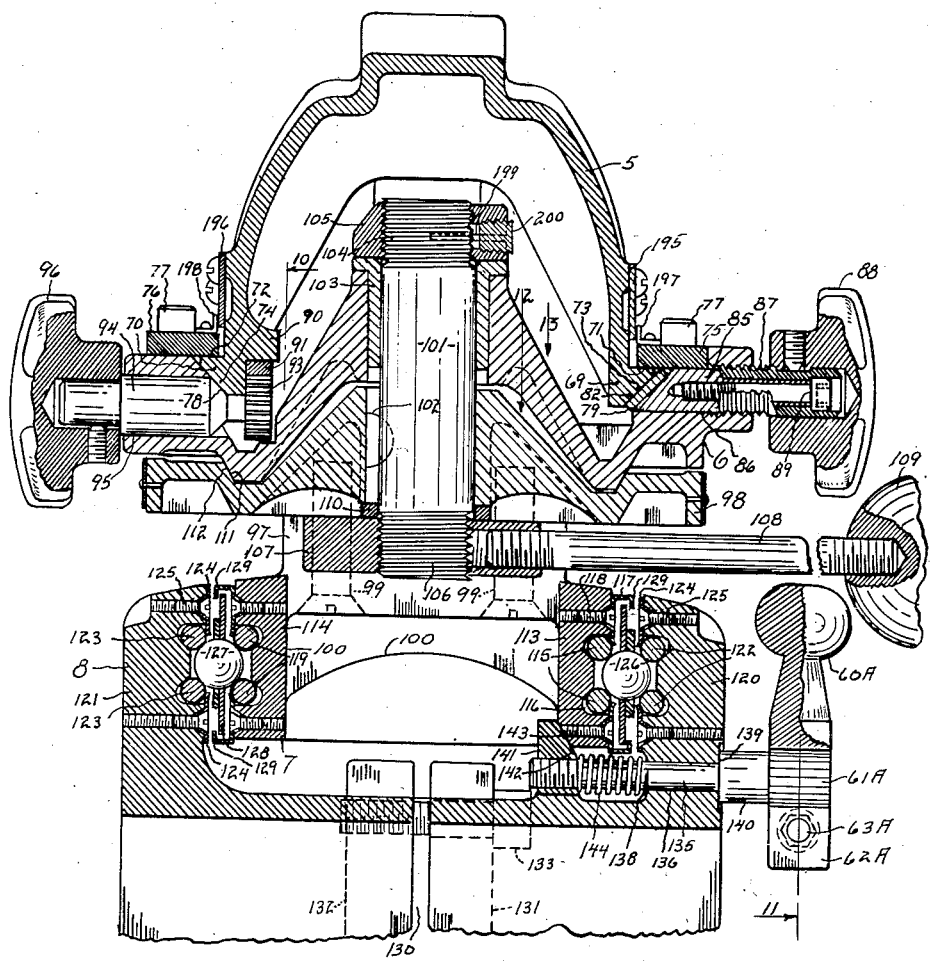
Fig. 9 is a sectional view from the plane 9—9 of Fig. 1.

The arm 5 as plainly shown in the drawing, Figs. 1 and 9, is an internally ribbed, downwardly open casting and at its rearward end has an internally projecting flange 66 resting upon an extenally projecting flange 65 on the top of the stem 4 and secured thereto by a plurality, such as three screws 67, one of which is shown in Fig. 1, projected upwardly through the flange 65 and threaded into the flange 66. This rigidly joins the arm 5 to the stem 4 as a single unit, whereby the arm 5 may be raised and lowered by the screw 35.

The arm 5 is formed to have an ornamental exterior contour and its outer end is closed by an ornamental cap 68. Extending forwardly and rearwardly along the arm and on its opposite sides, are guides 69 and 70, Figs. 1 and 4, which are parallel and which as shown in cross section in Fig. 9 have upper horizontal planar surfaces 71 and 72 respectively, and planar under surfaces 73 and 74, respectively, inclined downwardly and inwardly.

The aforesaid pivot carrying head 6 of Figs. 1 and 4, shown separately in Fig. 13 and in cross section in Fig. 9, is mounted on the guides 69 and 70 to be adjustably slidably positionable therealong, and to be locked thereon in any adjusted position as follows.

A pair of caps 75 and 76, Figs. 1, 4, and 9, are secured upon the upper side of the pivot carrying head 6, by screws 77—77, the overlap the horizontal surfaces 71 and 72, and slidingly engage the same, and support the weight of the pivot carrying head 6 and its associated parts.

The pivot carrying head has an inclined surface or face 78 engaging and fitting the inclined surface 74 of the guide 70; and the inclined surface 73 of the guide 69 is similarly engaged by the pivot carrying head, but through the agency of a gib 79 mounted thereon, shown in section in Figs. 9, 14, and 15 and longitudinally in plan in Fig. 13, this gib being mounted as foollows.

A pair of spaced pins 80—80 are press fitted into suitable drilled holes in the head 6 and the pins project loosely into holes 81 in the gib. The gib has a planar surface 82 and is positioned at an inclination to engage the surface 82 with the said inclined surface 73. Behind the gib are two spaced screws 83 threaded through the head 6 and abutting at their inner ends upon the back side of the gib 79 whereby the gib may be propelled inwardly (or outwardly) to adjust-ably take up lost motion between the surface 82 and the said surface 73; and lock screws 84 threaded into the same threads as the screws 83 may be screwed in to engage the screws 83 to lock them in adjusted positions.

By this means and with reference to Fig. 9, the gib 79 may be adjustably positioned toward and from the guide 69 to take up lost motion and provide a smooth sliding engagement between the caps 75 and 76 and the horizontal surfaces 71 and 72, and between the surface 78 and the surface 74, and between the gib itself and the surface 73.

Means is also provided to lock the pivot carrying head 6 in any adjusted position along the guides 69 and 70 and comprises, see Fig. 9, a plunger 85 behind the gib 79 reciprocable in a bore 86 in the pivot carrier 6 and connected to a threaded stem 87 which is threaded into the outer end of the bore 86 and provided with a handle 88 for turning the threaded stem. The threaded stem 87 has a rotary connection with a plunger 86 whereby the plunger 85 may be propelled in the bore without rotating therein upon turning the handle 88, and while this rotary connection may be variously made that shown in the drawing operates as follows. Upon screwing the stem 87 inwardly, its inner end engages the plunger 85 and propels it inwardly. Upon turning the stem 87 in the other direction, a shoulder 89 associated with and connected to the plunger 85 engages a corresponding shoulder within the handle 88 to propel the plunger 85 outwardly.

When the plunger 85 is propelled inwardly by the handle 88 it engages the back side of the gib 79, and because the gib 79 is loosely mounted on the carrier 6 by the pin construction above described, particularly in connection with Figs. 13 and 15, the gib will be forced into locking engagement with the guide 69 at the surface 73.

Figure 10:
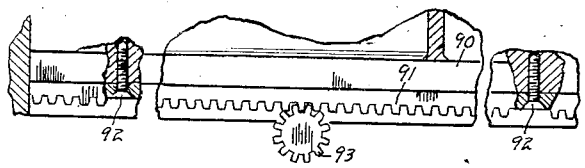
Fig. 10 is a fragmentary view from the plane 10 of Fig. 9.

As will become clearer hereinafter, adjustably positioning the pivot carrying head 6 along the guide 69 and 70, adjustably changes in general the working zone of the reciprocable saw 11 with respect to work on the work table 12. For some operations, the pivot carrier 6, after unlocking it from the guides 69 and 70 by the handle 88, may be shifted by hand, but in other instances it may be desired to adjustably position the pivot carrying head 6 with a very accurate or micrometer movement, and the means for this is shown in Figs. 9 and 10 and indicated in some of the other figures.

To this end, a longitudinal rib 90 is provided on the inside of the arm 5, and a toothed rack 91 is secured on the under side of the rib by a plurality of screws 92, projected through perforations in the rack and threaded into threaded holes in the rib. A pinion 93 has its teeth meshed with the teeth of the rack, and is connected to a shaft 94 rotatable in a bearing bore 95 in the carrier 6 and having a handle 96 on the shaft for turning it.

By turning the handle 96, the pinion 93 is rotated and propels the rack 91 and the carrier 6 on the guides 69 and 70 with micrometer movement. When the carrier is propelled by hand the pinion 93 and the handle 96 will be rotated idly.

The trackway referred to generally at 7 is mounted on the pivot carrying head 6 so as to be rotatably adjustable thereon about a vertical axis, and may be locked thereon in any adjusted position and the purpose of making the pivot carrier 6 adjustable along the arm 5 as described, is to adjustably move this vertical pivot axis; and the construction of this pivot axis will now be described and reference may be had to Figs. 1 and 9.

The trackway 7 is an elongated structure as shown in Fig. 1 and to be described, but at this point of the description, reference is made to two risers 97—97 extending upwardly from the upper side of the trackway as a whole and at about the middle of the trackway. Upon these risers 97 is mounted a clamping disc 98 by means of screws 99—99, Fig. 9, projecting upwardly through the risers and screwed into the disc 98. In Fig. 9, two of these screws are shown for one of the risers 97, and in Fig. 12 wherein the disc 98 is shown separately, all four screws 99 for the two risers are identified. It will be observed that there is an opening 100 in the trackway 7 under the risers 97 to give access to the screws 99.

The clamping disc 98 is shown separately in Fig. 12 and in section in Fig. 9 is in general circular, and at its center a large diameter pivot pin 101 extends therethrough and is keyed thereto as at 102, so that the disc and the pin will rotate together. At its upper end portion the pin 101 has rotational bearing in a bushing 103 in or on the pivot head 6, and the pin extends upwardly beyond the bushing, and is threaded as at 104, and a nut 105 on the threads 104 rests upon the upper end of the bushing 103. The lower end of the pin 101 projects downwardly out of the disc 98, and is threaded as at 106, and has a clamping nut 107 on the threads. A laterally extending rod 108 is threaded into the side of the nut 107 and on its outer end has a handle 109 by which an operator can turn the nut 107, through part of a revolution, to loosen or tighten it.

The upper side of the nut 107 when screwed upwardly on the threads 106 engages a bearing or clamping washer 110 on the disc 98.

By the construction thus far described, the weight of the trackway 7 and parts associated therewith to be described, is transmitted to the disc 98 and through the washer 110 to the nut 107 and stem 101 and thence to the nut 105, and thence to the head 6; and when the nut 107 is loosened, the trackway 7 and disc 98 may be rotated by hand, the pin 101 rotating in the bearing bushing 103, to angularly position the trackway 7; and when the nut 107 is tightened, the said parts are rigidly locked in their rotated positions by clampingly engaging the disc 98 with the head 6 above it, on mutually engaged large diameter wedging surfaces of the disc and head as follows.

The angular throw of the handle 108 to tighten or loosen the nut 107 is adjustable by taking up endwise lost motion of the pin 101 by the nut 105 on the top of the pin. The nut 105 is locked by being split as at 199 on one side and a set screw 200 threaded into the side of the nut, to spread the slot, upon engagement of the inner end thread of the set screw, with the inner end of the corresponding thread in the nut.

On the upper side of the disc 98 at 111 is a frustoconical surface, which if extended would have an apex in the central axis of the pin 101; and on the underside of the carrier 6 is a like surface 112 coinciding with the surface 111, these surfaces being shown in Figs. 9, 12, and 13. It will be observed in Fig. 9 that except for these engaging conical surfaces 111 and 112, the underside of the head 6 is out of contact with the upper side of the disc 98. When as described, the nut 107 is turned to screw it inwardly on the pin 101 and it engages the washer 110 of the disc 98, it raised the disc 98 to wedgingly engage the conical surfaces 111 and 112, and these being on large diameters, rigidly clamp the rotary disc 98 to the non-rotating head 6 in a manner to resist rotatation of the disc 98 and the trackway 7 attached thereto, even if, because of the length of the trackway 7, great torque should be applied thereto and to the disc 98 in the direction to turn it. It is needless to add that for obvious reasons, the pin 101 and the wedging surfaces 111 and 112 are coaxial.

As to the construction of the trackway 7, it is in general an elongated casting, Figs. 1 and 9, having spaced side walls 113—114, on the opposite outer portions of which are ball bearing raceways, formed of metal rods 115—115 (for the side wall 113) wedgingly seated in grooves 116—116 in vertically spaced apart parallel relation. Each of the rods 115 is retained in its groove 116 by a sheet metal strip 117 overlapping a part only of the rod 115, and mounted on the side wall 113 by screws 118.

Like rods 119—119 are similarly provided on the side wall 114 and secured thereon in a similar manner.

These raceway rods are disposed so that the rods of each pair 115—115 and 119—119 are parallel to each other, and so that the rods of one pair are parallel to the rods of the other pair.

As to the carriage 8, it comprises two side portions 120 and 121 extending upwardly opposite the trackway side walls 113 and 114, and spaced therefrom as shown in Fig. 9, and provided with short raceway rods 122—122 for the side portion 120, and 123—123 for the side portion 121, seated in grooves therein similar to those provided for the trackway rods; and each carriage rod is held in a groove by a sheet metal strip 124 overlapping a part only of the rod and secured on the carriage by screws 125.

The carriage 8 is supported on the trackway 7 by a series of bearing balls 126 between and engaging the raceway rods 122—115 and by a series of balls 127 between and engaging the raceway rods 123 and 119; and each series of balls is maintained in longitudinally spaced relation by a strip-like cage construction 128 in which the balls are loosely trapped.

The carriage 8 may be reciprocatively propelled longitudinally along the trackway, the raceway rods of the carriage rolling on the balls and the balls rolling on the raceway rods of the trackway. Preferably the cage construction 128 is prevented from dragging on adjacent parts with undue friction by tongues 129 formed on the metal rod retainers 117 and hooking over adjacent portions of the cage construction, as shown.

The aforesaid hangers 9 and 9A for supporting the motor 10 are preferably cast integrally with the carriage 8 and depend therefrom. These hangers have upwardly open slits 130, Figs. 2, 3, and 9 at their upper ends. This construction makes the upper ends of the hangers in two separate parts 131—132, and completely separates the side portions 120 and 121 of the carriage. Bolts 133, Fig. 9, are projected through one of the hanger portions 131 and threaded into the other portion 132; and upon screwing these bolts in or out, the resilience of the cast metal hangers allows the upper portions 131 and 132 to be drawn closer together or to move farther apart, and this adjusts the positions of the side portions 120 and 121, whereby undue lost motion in the ball bearing trackway and carriage construction described above, may be removed and the bearings adjusted. The bolt 133 at the upper end of one hanger arm 9 is shown in Fig. 9 and Fig. 1 and the other bolt 134 for the other hanger arm is shown in Figs. 1 and 2. Either or both of these bolts may be turned to adjust the parts of the ball bearing and raceway construction as described.

The ball bearing construction described permits the carriage 8 to be propelled without friction along the trackway 7. Means is provided however to lock it against movement along the trackway. This means comprises, Fig. 9, a shaft 135 rotatable in a bearing bore 136 in one side portion of the carriage 8, for example the side portion 120 as shown; and a handle 60A is mounted on the shaft 136 to turn it. The bearing bore 136 has shoulders 138 and 139 at its opposite ends, and the shaft 135 has an enlarged diameter portion 140 abutting the shoulder 139.

The inner end of the shaft 135 is screw threaded into a gib 141 having an inclined or wedging surface 142 engageable with a like wedging surface 143 extending along the trackway side wall 113. A spring 144 surrounds the shaft 135 and abuts at one end upon the gib 141 and at the other end upon the shoulder 138.

The spring holds the shaft 135 toward the left as viewed in Fig. 9 with the enlarged diameter portion 140 engaging the shoulder 139, the spring reacting upon the shoulder 138 and the gib 141 to this effect.

Upon rotating the shaft 135 by the handle 60A in one direction, the gib 141 is propelled along the threads of the shaft, in the nature of a traveling nut, to disengage the said wedging surfaces 142 and 143 to free the carriage 8; and when the handle is rotated in the other direction, the gib 141 travels along the threads to frictionally engage the said wedging surfaces to lock the carriage against movement on the trackway.

The preferred means of mounting the handle 60A on the shaft portion 140 is shown in Fig. 11, and will be understood from the description already given of a like means for attaching the handle 60 of Fig. 8 to the screw 59.

The motor 10 has its rotary shaft directly connected to the saw 11, and this being common in tools of this general class, the details thereof have not been illustrated. The motor is supported at the lower ends of the hangers 9 and 9A by trunnion bearings by which the motor may be adjustably rocked around a trunnion axis at right angles to the rotational axis of the saw, and this will now be described, reference being had to Figs. 1, 2, and 3 and particularly Fig. 5.

On the left side of the motor as viewed in Fig. 5 is a large diameter trunnion 145 in the form of a cup. It is shown in one piece but optionally its bottom may be a separate piece. The outer wall surface of the cup is cylindrical; and the lower end of the trunnion 9A is enlarged into a ring 146, having a cylindrical bore 153 in which the trunnion 145 has rotary bearing. The ring is split on one side as at 147, and provided with two lugs 148—149 at each side of the slit, and a bolt 150 having a handle 151 thereon for turning it, is projected through aligned bores in the lugs and into a nut 152, whereby the ring 146 may be contracted to grip the trunnion 145 or released so that the trunnion can be turned therein.

It may be added here that the opposite trunnion bearing in the hanger 9 is constructed to prevent endwise shifting of the motor 10 on the hangers, so that the trunnion 145 is allowed to float axially in the bore 152 when freed as described.

The cup form trunnion 145 is mounted upon the motor by any suitable means, that shown comprising a plurality of bolts 154 shown in Fig. 2 one of which is shown in Fig. 5, projected through the bottom of the cup and on through the cup and screwed into the motor frame.

An operator's handle 155 of U-form is mounted upon the cup trunnion 145 by bolts 156 projected through the cup bottom and screwed into the open ends of the handle, and, as will be more fully referred to, the handle may be used to reciprocate the motor and the carriage 8 along the trackway 7, in all rotated positions of the motor 10 on its trunnions.

The cup form trunnion 145 is made deeper axially than would be necessary to give bearing in the hanger ring 146, so as to serve as a housing for electrical connections and control apparatus for the motor 10. Electric current is conducted to the interior of the motor housing by an electric cable fragmentarily shown at 157, and the starting and stopping switch for the motor is made convenient to the hand of the operator while grasping the handle 155 to operate the motor driven saw, by being mounted as shown at 158, upon the bottom of the cup 145, the switch shown being of the type comprising a toggle arm 159, and electric wires 160 being led from the motor to the switch and connected thereto interiorly of the cup form trunnion.

In some cases, the motor 10 will be a single phase alternating current motor, the starting circuit of which comprises a condenser, and in such cases the condenser 161 may be mounted within the cup form trunnion and connected to the motor circuit by suitable wires as shown. Also, in some cases it may be desired to provide an automatic current overload switch of the push button reset type, and such a device is shown generally at 162 within the cup form trunnion, and with its reset push button 163 projecting outwardly through the cup bottom wall and accessible to the hand of the operator grasping the handle 155.

Various other types of electrical apparatus associated with the starting and stopping of the motor 10 and adapted to different kinds of motors and starting systems may be mounted within the cup form trunnion as will be understood. The trunnion 145 thus performs a number of functions in addition to its function as a trunnion bearing.

At the right hand side of the motor 10 as viewed in Fig. 5 the trunnion bearing for the motor on the hanger 9 is as follows.

A mounting plate 164 is mounted upon the motor frame in any suitable manner for example by a plurality of screws 165, and has an axially disposed threaded hole 166 therein. A stud 167A is screwed into the hole 166, rigidly, by means of a shoulder 168A on the stud engaging the plate 164; and has an enlarged head 168 on its outer end and intermediately has a trunnion shaft portion 167.

The lower end of the hanger 9 is enlarged into a ring 169 and a bearing plate 170 is mounted on the ring by a plurality such as four screws 171, Figs. 3, 5, and 6. The bearing plate 170 has a bearing bore 172 therein which the trunnion shaft 167 may rotate or oscillate, and at the ends of the bore 172 the material of the bearing plate, by engaging at one end the plate 164 and by engaging at the other end the enlarged head 168, prevents axial shifting of the motor at this trunnion bearing.

It is desirable to be able to adjust the axis of rotation of the saw with respect to the plane of reciprocation of the saw along the trackway in all pivoted positions of the trackway on its described pivot axis, and to this end the trunnion axis on the hanger 9 is made universally adjustable thereon by the following means shown best in Figs. 5 and 6.

The screws 171 which secure the bearing plate 170 to the ring 169 of the hanger 9 pass through holes 173 in the bearing plate 170 larger than the screws. The bearing plate 170 has on its inner side a cylindrical rib 174. A plurality such as four, radial screws 175, see also Fig. 3, are threaded radially through the ring 169 and with their inner ends abutting the rib 174. By first loosening the screws 171, one of the screws 175 may be backed out a fraction of a turn and the diametrically opposite screw 175 screwed in correspondingly, which has the effect of shifting the trunnion shaft 167 with respect to the hanger 9. The screws 171 are then again tightened to fix the adjustment. As a further precaution to fix the adjustment, the threaded bores for the screws 175 may be longer axially than the screws themselves, but permitting a screw driver to enter the threaded holes to turn the screws, and after the screws have been adjusted, locking screws 176 may be screwed into the holes tightly upon the outer ends of the screws 175 to lock them.

As to the work table 12, Figs. 1 and 16 to 21, it is made of wood and in two parts having a common top plane 201, a front part 177 and a rear part 178, and with a forward fence 179 therebetween; the fence being removably secured in position by wedges 180 driven in between the fence and the rear part 178. The two parts of the table are connected together by side cleats 181—181 and by plates 182 screwed upon the bottom of the table parts; and the cleats and the plates support the fence 179 and the wedges 180 as will be clear from the drawing. A rear fence 183 is also provided at the rear of the table, being screwed to the table part 178, and the two fences 179 and 183 are parallel.

By means best shown in Fig. 17 but also shown in Figs. 1 and 16, the table 12 as a whole is mounted upon and secured to the cast metal base 1 by means which permits the table to be adjusted to level up its top plane surface or, in other words, to dispose or restore the top surface in a plane parallel to the plane of reciprocatory movement of the saw in all angularly adjusted positions of the trackway.

To this end, a plurality such as four studs 184 are screwed into bosses 185 formed on the base 1, and project above the base, and have wrench receiving heads 186 for turning them to screw them in and out. The upper ends of the studs 184 are flat or planar and the table 12 rests thereon and is supported thereby. The upper ends of the studs 184 are internally threaded as at 187. Screws 188 are projected downwardly through the table 12 and screwed into the threads 187 of the studs, the heads of the screws 188 engaging the bottoms 189 of counterbored holes in the table top, and the upper ends of the screws 188 are well below the top surface of the table to be out of the path of the teeth of the saw. The screws 188 when screwed down tight, clamp the table 12 between the heads of the screws and the tops of the studs 184, and this clamping action on the studs 184 also locks them against rotation. To level up the top of the table as described, the screws 188 or some of them may be loosened and the corresponding studs 184 turned to screw them in or out of the bosses 185, to lower or raise their upper ends, and then the screws 188 again tightened.

As indicated in Fig. 16, the heads of the screws 188 may have hexagonal recesses 190 therein to receive an Allen wrench for turning them; and to turn the studs 184, an ordinary thin flat wrench may be inserted laterally between the top of the base 1 and under side of the table 12 to engage the heads 186.

As mentioned, the motor and saw may be adjustably rocked on its above described trunnion axis and secured in rocked position by the bolt 150 on the hanger 9A, and to indicate the angular rocked positions, a scale 191 is provided on a strip of metal wrapped around a part of the trunnion 145, see Figs. 1 and 5, and secured thereon, and a scale pointer 192 therefor is mounted on the hanger 9A.

The trackway 7 being pivoted for movement to different angular positions around a vertical axis on the arm 5, a scale 193 is provided on a band of metal wrapped around and secured to the circular periphery of the disc 98, Figs. 1 and 9, and a scale pointer 194 therefor is mounted on the pivot carrying head 6.

The pivot carrier 6 being adjustably movable along the arm 5 on the guides 69 and 70, two scales 195 and 196 are provided to indicate its position and the position of the saw, with respect to the two fences 179 and 183, respectively, on the work table 12, the scales 195 and 196 being shown in Figs. 1, 4, and 9 and a pointer 197 for the scale 195 and a pointer 198 for the scale 196 are provided, respectively mounted on the caps 75 and 76, shown in Fig. 9, and indicated in Figs. 1 and 4.

In the operation of the machine to make ordinary cross cuts or miter cuts with the saw 11, the piece to be cut is laid on the table part 177 and against the fence 179; see Fig. 1. The handle 109 is operated and the trackway pivot is positioned toward the left or toward the right, as viewed in Fig. 1, to give to the saw a suitable reciprocatory range for the work. By means of a scale 193 and pointer 194 the plane of the saw is adjusted for right angle cross cutting or for any desired angle of miter cutting; and the crank 54 is operated to raise and lower the saw so that its teeth just cut into the top of the table; and then the operator by means of the handle 155 reciprocates the saw to cut the work, and to complete the work the saw will cut through the fence 179.

To make bevel cuts, the reciprocatory direction of the saw is adjusted as above described for cross cutting, and, additionally, the motor and the saw are rocked on the trunnion axis to set the plane of the saw at the bevel angle desired, by means of the scale 191 and the scale pointer 192, by operating the handle 151 and manually rocking the motor on its trunnions.

For making rip cuts, the trackway 7 is rotated on its vertical axis to dispose the plane of the saw parallel to the fence 179, utilizing the scale 193 and the pointer 194, and the vertical pivot axis for the trackway is positioned along the arm 5 to space the plane of the saw from the fence for the desired width of trip cut, utilizing the scale 195 and the pointer 197. In some cases, the rip cut to be made will be so far from the fence 179 that the fence 183 will be used.

If the rip cut is to be so far from the fence 183 that the work to be cut overlaps the fence 179, the fence 179 is first removed by removing the wedges 180—180.

In either case to position the plane of the saw at the required distance from the fence 183, the pivot axis for the trackway 7 is positioned along the arm 5 utilizing the scale 196 on the other side of the arm and its pointer 198.

In positioning the saw for ripping in either case, the plane of the saw may be accurately positioned with respect to the fence by utilizing the micrometer movement arrangement described operated by the handle 96.

It will be apparent that other operations may be performed with the tool; and as is well known in this art other tools than the saw 11 illustrated in the drawing may be mounted on the motor shaft. The construction as illustrated and described provides for rocking the motor 10 on the trunnion axis until the rotary axis of the motor and the tool is vertical, with the tool under the motor, and such tools rotating on the then vertical motor axis may be used; concurrently with reciprocation along the trackway 7; or, for a fixed position of the carriage along the trackway 7, by raising and lowering movements of the tool by the crank 54; or for a given fixed position of the carriage along the trackway 7, by rotating the trackway 7 on its vertical pivot axis.

The construction above described admits of accurate adjustments of the tool to prepare it for operation or readjustment if due to any cause it gets out of adjustment as follows.

The trackway 7, in its different angular positions around its vertical axis, defines a trackway plane. The plane of rotation of the saw 11 may be set at right angles to this plane by rocking the motor 10 on its trunnions, and then the scale 191 and the pointer 192 may be relatively shifted and set to indicate that position.

In any rotated position of the trackway 7 around its vertical axis, it will determine a line of reciprocation for the saw, and the plane of the saw 11 can be set parallel to that line of reciprocation, by the trunnion adjustment on the hanger 9.

With the trackway 7 rotated on its vertical axis until the plane of the saw 11 is either at right angles to or parallel to the fence 179, the scale 193 and its pointer 194 may be shifted relatively and set to indicate that position.

With the trackway 7 rotated on its vertical axis to position the saw blade 11 coincident with the forward fence 179, the scale 195 on the arm 5 and its pointer 197 may be set to indicate that position; and the scale 196 and its pointer 198 on the other side of the arm may similarly be shifted relatively and set with respect to the fence 183.

The scales and their pointers may in each case be adjustably relatively shifted and then set or fixed in adjusted positions for the aforesaid purposes by any well known means of mounting them, for example by slots in the scales and mounting screws in the slots.

The top surface of the table 12 may be adjusted to be parallel with the said plane of the trackway 7, or so that the lower edge of the saw 11 will just touch it in all positions of the trackway by manipulation of the adjusting studs 184 described in connection with Fig. 17.

While I have illustrated all of the constructional features of the machine tool in detail, it will be understood by those skilled in the art that these details may be variously changed and modified; and the invention comprehends all such changes and modifications which come within the the scope of the appended claims.

I claim:

1. In a machine tool, a work table; an arm overhanging the work table; a pivot bearing construction on the arm; a trackway pivotally supported on the bearing construction to be swung to different operative positions; a carriage reciprocable on the trackway; a motor driven tool suspended from the carriage to perform operations on work pieces on the work table upon reciprocation of the carriage; the pivot bearing construction being adjustably positionable along the arm to adjustably position the trackway over the work table; means to secure the pivot bearing construction to the arm in adjusted positions; and means to secure the trackway against swinging in all swung positions.

2. In a machine tool, a work table; an arm overhanging the work table; a pivot bearing construction on the arm; a trackway pivotally supported on the bearing construction to be swung to different positions; a carriage reciprocable on the trackway; a motor driven tool suspended from the carriage to perform operations on work pieces on the work table upon reciprocation of the carriage; the arm having guideway means upon which the bearing construction is guidedly shiftable along the arm to adjustably position the trackway over the work table; operable means to rigidly secure the bearing construction to the arm in shifted positions, and to release it therefrom for shifting along the guideway means; and operable means to secure the trackway against swinging in all swung positions.

3. In a machine tool, a work table; an arm overhanging the work table; a pivot bearing construction on the arm; a trackway pivotally supported on the bearing construction to be swung to different positions; a carriage reciprocable on the trackway; a motor driven tool suspended from the carriage to perform operations on work pieces on the work table upon reciprocation of the carriage; the arm having guideway means upon which the bearing construction is shiftable along the arm to adjustably position the trackway over the work table; operable means to rigidly secure the bearing construction to the arm in shifted positions, and to release it therefrom for shifting along the guideway means; operable means to secure the trackway against swinging in all swung positions; and operable means to shift the bearing construction with micrometer movements, comprising an operator's handle and motion reducing means between the handle and the shiftable bearing construction.

4. In a machine tool, a work table; an arm overhanging the work table; a pivot bearing construction on the arm; a trackway pivotally supported on the bearing construction to be swung to different positions; a carriage reciprocable on the trackway; a motor driven tool suspended from the carriage to perform operations on work pieces on the work table upon reciprocation of the carriage; the arm having guideway means upon which the bearing construction is shiftable along the arm to adjustably position the trackway over the work table; operable means to rigidly secure the bearing construction to the arm in shifted positions, and to release it therefrom for shifting along the guideway; operable means to secure the trackway against swinging in all swung positions; a rack associated with the arm; a pinion meshed with the rack and supported by a bearing on the pivot bearing construction; and a handle to rotate the pinion, to shift the bearing construction along the guideway means with micrometer movements.

5. In a machine tool, a work table; an arm overhanging the work table; a pivot bearing construction on the arm; a trackway pivotally supported on the bearing construction to be swung to different positions; a carriage reciprocable on the trackway; a motor driven tool suspended from the carriage to perform operations on work pieces on the work table upon reciprocation of the carriage; the pivot bearing construction being shiftable on the arm to adjustably position the trackway over the work table; means to secure the bearing construction to the arm in shifted positions; means to secure the trackway against swinging in all swung positions; a scale on the arm, and a scale pointer movable with the bearing construction, to indicate shifted positions of the bearing construction.

6. In a machine tool, a work table having two spaced abutments against which, selectively, work pieces may be placed to position them; an arm overhanging the work table; a pivot bearing construction on the arm; a trackway pivotally supported on the bearing construction; a carriage reciprocable on the trackway; a motor driven tool suspended from the carriage to perform work operations on the work pieces upon reciprocation of the carriage; the pivot bearing construction being shiftable along the arm to adjustably position the tool with respect to the said abutments; means to secure the bearing construction to the arm in shifted positions; two scales on the arm; a scale pointer for each scale movable with the bearing construction, and respectively indicating the position of the tool with respect to the two abutments, respectively.

7. In a machine tool, a work table for supporting work pieces and having two spaced abutments against which, selectively, work pieces may be placed to position them; an arm overhanging the work table; a support on the arm and a trackway carried by the support; a carriage reciprocable on the trackway; a motor driven tool suspended from the carriage; the support being movable along the arm to adjustably position the trackway with respect to either of the abutments selectively; and means to secure the support to the arm in adjusted positions.

8. In a machine tool, a base; a work table having a horizontal work supporting surface; an arm on the base overhanging the work table; a pivot bearing construction on the arm, having a vertical pivot axis; a horizontal trackway supported by the arm to be adjustably swung on a bearing axis; a carriage reciprocable on the trackway; a motor driven tool supported by the carriage; the pivot bearing construction being shiftable along the overhanging arm to adjustably position the trackway pivot axis over the work table; means to secure the bearing construction to the arm in shifted positions; and means to secure the trackway against swinging on the axis in different adjusted swung positions.

9. In a machine tool, a work table; an arm overhanging the work table; a pair of parallel guideways on the arm; a carrier having guides engaging the guideways and movable therealong to adjustably position the carrier on the arm; operable means to secure the carrier to the arm in adjusted positions; a trackway under the arm; a carriage reciprocable on the trackway; a motor driven tool suspended from the carriage; a supporting pivot bearing construction for the trackway on the carrier on which the trackway may be swung to different adjusted positions, to adjust the direction of carriage reciprocation, comprising a rotary element under the carrier supporting the trackway; a pivot axis pin on the carrier supporting the rotary element; mutually engageable conical surfaces on the carrier and rotary element; and operable means to clamp the conical surfaces together.

10. In a machine tool, a trackway having spaced parallel guideways; a carriage having two bearing portions provided with bearings, oppositely confronting and engaging the guideways and reciprocable thereon; hanger arms depending from the carriage; a motor driven tool supported on the hanger arms; each hanger arm comprising two joined adjacent arm portions connected respectively to the two bearing portions of the carriage; means to adjust the clearance between the bearings and guideways comprising means for adjustably drawing the arm portions of each arm closer together or causing them to move farther apart.

11. In a machine tool, a trackway having spaced parallel guideways; a carriage having two bearing portions provided with bearings, oppositely confronting and engaging the guideways and reciprocable thereon; hanger arms depending from the carriage; a motor driven tool supported on the hanger arms; each hanger arm comprising two adjacent resilient arm portions, connected respectively to the two bearing portions of the carriage; means to adjust the clearance between the bearings and guideways comprising means for adjustably drawing the arm portions of either arm closer together or allowing them to resiliently move farther apart.

12. In a machine tool, a work supporting table; an arm overhanging the table; a trackway under the arm; a motor driven carriage for the tool reciprocable on the trackway; a carrier adjustably positionable along the arm; means to lock the carrier to the arm in adjusted positions; a pivot connection between the trackway and the carrier on which the trackway may be pivotally positioned about an axis at right angles to the trackway; the pivot connection comprising a rotary element connected to the trackway; a pivot pin associated with the rotary element and carrier about the axis of which the rotary element and trackway may pivotally move; and operable means to frictionally clamp the rotary element to the carrier in pivotally rotated positions thereof.

13. In a machine tool having a work table and an arm overhanging the work table; a pivot bearing construction mounted for reciprocation along said arm; a trackway pivotally supported on said pivot bearing construction and thereby adapted to be swung over said work table to different angular positions with respect to said arm; a carriage supported for reciprocation along said trackway, said carriage being adapted to support a tool over said work table.

14. In a machine tool having a work table and an arm overhanging the work table: guideways on the arm; a pivot bearing construction supported for reciprocation along said guideways; a trackway pivotally supported on said bearing construction; a carriage mounted for reciprocation along said trackway, said carriage being adapted to support a tool over said work table; and separate means operable, respectively, to lock said bearing construction in its adjusted position along said guideways, to lock said trackway in its adjusted angular position on said bearing construction, and to lock said carriage in its adjusted position on said trackway whereby said tool may be locked in any preselected position resulting from said adjusted positions over said work table.

15. In a machine tool having a work table and a carriage movable over said work table; a pair of spaced hangers depending from said carriage; said hangers being provided with circular through bores; and electric motor for driving a machine tool; means supporting said motor in said hangers with its axis normal to the axis of said bores comprising, a hollow cylindrical trunnion attached to one side of said motor rotatably received within one of said bores; motor control means mounted in said trunnion; means for varying the size of said one of said bores for clamping said trunnion therein; a second trunnion attached to the opposite side of said motor; means in the other of said bores rotatably supporting said second trunion while fixing said second trunnion against axial movement, whereby the axis of rotation of said motor may be angularly adjusted about the axis of said trunnions while being held against axial movement and may be locked in any preselected angular position.

CARL F. DUERR, Jr.

REFERENCES CITED

The following references are of record in the file of this patent:

UNITED STATES PATENTS

| Number | Name | Date |
|---|---|---|
| 50,745 | Sparrow | Oct. 31, 1865 |
| 206,648 | Tucker | July 30, 1878 |
| 398,173 | Meeker | Feb. 19, 1889 |
| 729,410 | Popky | May 26, 1903 |
| 831,938 | De Kubber | Sept. 25, 1906 |
| 1,407,704 | Morris | Feb. 28, 1922 |
| 1,697,873 | Lambert | Jan. 8, 1929 |
| 1,733,518 | Snover | Oct. 29, 1929 |
| 1,748,446 | Gatzsch | Feb. 25, 1930 |
| 1,756,121 | Hedgpeth | Apr. 29, 1930 |
| 1,761,712 | Emmert | June 3, 1930 |
| 1,813,568 | De Walt | July 7, 1931 |
| 1,956,835 | Roemer | May 1, 1934 |
| 2,075,282 | Hedgpeth | Mar. 30, 1937 |
| 2,247,708 | Jordan | July 1, 1941 |
| 2,291,999 | Wilson et al. | Aug. 4, 1942 |
| 2,312,356 | Ocenasek | Mar. 2, 1943 |
| 2,317,568 | Wallace et al. | Apr. 27, 1943 |
| 2,329,345 | Gardner | Sept. 14, 1943 |
| 2,343,243 | Roemer | Mar. 7, 1944 |
| 2,364,475 | Roemer | Dec. 5, 1944 |
| 2,366,512 | Gardner | Jan. 2, 1945 |
| 2,397,614 | Middleton | Apr. 2, 1946 |

FOREIGN PATENTS

| Number | Country | Date |
|---|---|---|
| 282,593 | Great Britain | Dec. 29, 1927 |